US010432459B2

United States Patent
Guerrero et al.

(10) Patent No.: US 10,432,459 B2
(45) Date of Patent: Oct. 1, 2019

(54) METHOD FOR THE AUTOMATIC CONFIGURATION OF PORTABLE TERMINALS

(71) Applicant: Datalogic IP Tech, S.r.l., Lippo di Calderara (IT)

(72) Inventors: Marco Guerrero, Bologna (IT); Stefano Amorosi, Sasso Marconi (IT); Elva Martinez-Ballesteros, Springfield, OR (US)

(73) Assignee: DATALOGIC IP TECH, S.R.L., Lippo di Calderara (BO) (IT)

( * ) Notice: Subject to any disclaimer, the term of this patent is extended or adjusted under 35 U.S.C. 154(b) by 958 days.

(21) Appl. No.: 14/655,044

(22) PCT Filed: Dec. 24, 2012

(86) PCT No.: PCT/IT2012/000400
§ 371 (c)(1),
(2) Date: Jun. 23, 2015

(87) PCT Pub. No.: WO2014/102836
PCT Pub. Date: Jul. 3, 2014

(65) Prior Publication Data
US 2015/0341217 A1    Nov. 26, 2015

(51) Int. Cl.
*H04L 12/24* (2006.01)
*H04L 29/08* (2006.01)
(Continued)

(52) U.S. Cl.
CPC .......... *H04L 41/0816* (2013.01); *H04L 67/18* (2013.01); *H04W 4/023* (2013.01); *H04W 4/50* (2018.02)

(58) Field of Classification Search
CPC ............ H04L 41/0816; H04L 41/0823; H04L 41/0826; H04L 67/18; H04L 41/083;
(Continued)

(56) References Cited

U.S. PATENT DOCUMENTS

| 6,985,849 B1 * | 1/2006 | Brooks | ................... G06F 9/455 703/26 |
| 7,333,514 B2 * | 2/2008 | Anehem | ............... H04W 28/14 370/474 |

(Continued)

FOREIGN PATENT DOCUMENTS

| JP | 2007207106 A * | 8/2007 | |
| WO | WO 2011057656 A1 * | 5/2011 | ............. H04H 20/61 |
| WO | WO-2014032230 A1 * | 3/2014 | ........... H04B 5/0031 |

*Primary Examiner* — Kostas J Katsikis
(74) *Attorney, Agent, or Firm* — Stoel Rives LLP

(57) ABSTRACT

A method for the automatic configuration of portable terminals, comprises the steps of detecting the geographical position of at least two portable terminals (T1-T7) and configuring said at least two portable terminals (T1-T7) on the basis of the respective geographical position which has been detected. The configuration of said at least two portable terminals (T1-T7) comprises: configuring at least one first terminal (T1; T7) with predetermined configuration parameters selected on the basis of the respective geographical position, detecting a condition of geographical proximity of at least one second terminal (T2-T6) with respect to said at least one first terminal (T1; T7) and at least partially cloning said at least one first terminal (T1; T7) into said at least one second terminal (T2-T6).

20 Claims, 2 Drawing Sheets

(51) Int. Cl.
*H04W 4/02* (2018.01)
*H04W 4/50* (2018.01)

(58) Field of Classification Search
CPC ............ H04L 41/0833; H04L 41/0836; H04L 41/0886; H04W 4/023; H04W 4/50; H04M 1/72525; H04M 1/72572
See application file for complete search history.

(56) References Cited

U.S. PATENT DOCUMENTS

| | | | | |
|---|---|---|---|---|
| 7,599,795 | B1* | 10/2009 | Blumberg | G01C 21/20 701/426 |
| 7,702,320 | B2* | 4/2010 | Komura | H04M 1/0202 235/487 |
| 7,826,837 | B1* | 11/2010 | Sylvester | H04W 24/06 455/423 |
| 8,151,319 | B2* | 4/2012 | Dhand | H04L 63/0492 726/3 |
| 8,229,458 | B2* | 7/2012 | Busch | H04W 4/029 455/456.1 |
| 8,612,310 | B2* | 12/2013 | Yates | G06Q 10/101 705/26.7 |
| 8,742,688 | B2* | 6/2014 | Lee | H05B 33/0842 315/294 |
| 9,125,169 | B2* | 9/2015 | Nichols | H04L 67/306 |
| 2002/0034953 | A1* | 3/2002 | Tricarico | G01S 5/0027 455/456.2 |
| 2004/0054767 | A1* | 3/2004 | Karaoguz | H04W 16/18 709/223 |
| 2004/0176032 | A1* | 9/2004 | Kotola | G06K 7/0008 455/41.2 |
| 2004/0203889 | A1* | 10/2004 | Karaoguz | H04L 29/06 455/456.1 |
| 2004/0203931 | A1* | 10/2004 | Karaoguz | G01S 13/878 455/457 |
| 2005/0088997 | A1* | 4/2005 | Melpignano | H04W 88/08 370/338 |
| 2007/0121541 | A1* | 5/2007 | Matsuo | H04L 12/2856 370/328 |
| 2008/0031203 | A1* | 2/2008 | Bill | H04L 51/04 370/338 |
| 2008/0039020 | A1* | 2/2008 | Eskin | G01S 1/68 455/41.2 |
| 2008/0182589 | A1* | 7/2008 | Buccieri | H04W 4/02 455/456.3 |
| 2008/0195312 | A1* | 8/2008 | Aaron | G06Q 10/109 455/418 |
| 2008/0233981 | A1* | 9/2008 | Ismail | H04L 51/20 455/466 |
| 2008/0276182 | A1* | 11/2008 | Leow | H04M 1/72525 715/740 |
| 2008/0294650 | A1* | 11/2008 | Karlsson | G06F 17/30041 |
| 2009/0063624 | A1 | 3/2009 | Nordstrom et al. | |
| 2009/0182931 | A1* | 7/2009 | Gill | G06F 21/79 711/103 |
| 2009/0186575 | A1* | 7/2009 | Cedo Perpinya | H04W 8/005 455/41.2 |
| 2010/0105373 | A1* | 4/2010 | Kanade | H04W 48/16 455/418 |
| 2011/0156640 | A1* | 6/2011 | Moshfeghi | H02J 50/20 320/108 |
| 2011/0161365 | A1* | 6/2011 | Shin | H04L 67/12 707/769 |
| 2011/0191662 | A1* | 8/2011 | Poteet, II | G06F 17/00 715/202 |
| 2011/0310867 | A1* | 12/2011 | Kennedy | G01C 21/3461 370/338 |
| 2012/0057508 | A1* | 3/2012 | Moshfeghi | H04B 1/28 370/277 |
| 2012/0102409 | A1* | 4/2012 | Fan | H04W 4/00 715/738 |
| 2012/0147783 | A1 | 6/2012 | Shaffer et al. | |
| 2012/0215874 | A1 | 8/2012 | Sequeira et al. | |
| 2012/0271725 | A1* | 10/2012 | Cheng | H04W 4/21 705/21 |
| 2012/0307658 | A1* | 12/2012 | Xia | H04L 47/122 370/252 |
| 2012/0329430 | A1* | 12/2012 | Chatani | H04L 12/12 455/411 |
| 2013/0095756 | A1* | 4/2013 | Hamilton | H04W 4/023 455/41.1 |
| 2013/0170373 | A1* | 7/2013 | Xia | H04W 72/04 370/252 |
| 2013/0346559 | A1* | 12/2013 | Van Erven | H04L 12/2807 709/219 |
| 2014/0065958 | A1* | 3/2014 | Yao | H04B 5/0031 455/41.1 |
| 2014/0075511 | A1* | 3/2014 | Lessiak | H04L 65/1069 726/4 |
| 2014/0152526 | A1* | 6/2014 | Greig | H01Q 1/40 343/866 |
| 2014/0160978 | A1* | 6/2014 | Palin | H04W 8/005 370/254 |
| 2014/0181246 | A1* | 6/2014 | Richardson | H04B 7/026 709/217 |
| 2014/0342756 | A1* | 11/2014 | Houri | G01S 5/0252 455/456.2 |
| 2015/0256976 | A1* | 9/2015 | Scuba | H04L 67/18 455/456.3 |

\* cited by examiner

METHOD FOR THE AUTOMATIC CONFIGURATION OF PORTABLE TERMINALS

The present invention relates to a method for the automatic configuration of portable terminals.

In particular, the method of the present invention allows the automatic and centralised configuration of many portable terminals on the basis of the geographical position thereof.

Throughout the present description and in the following claims, the expression "portable terminals" is used to indicate electronic and/or optoelectronic devices of any type which can be moved within a certain geographical area. We refer, for example, to optical code readers, palmtop computers, laptop computers, PDAs, tablet computers, cell phones, portable measuring equipment and more generally to portable devices that are capable of being connected within wireless networks through a suitable radio frequency transmission/reception device, etc.

Throughout the present description and in the following claims, the term "configuring", "configuration" and the like, is used to refer to any operation of adjusting the operation parameters of the aforementioned portable terminals in order to allow a correct or desired operation thereof.

Throughout the present description, the expression "geographical area" is used to indicate any area of any dimensions, indoors or outdoors.

In many cases, portable terminals must be configured on the basis of the geographical area in which they are used and many terminals used in the same geographical area must be configured in an identical manner. This is necessary, for example, when in a certain geographical area it is required a certain operation modality of the terminals that is different from other operative modalities required in other geographical areas.

As an example which should not limit the scope of the present invention, let us consider the case in which a plurality of portable terminals are used inside a building. Each room of the building can require a particular configuration of the operation modality of the portable terminals located therein in terms of managing the power supply, adjusting the wireless communication parameters, the level of brightness of the screen as a function of the ambient light, etc.

For such a purpose, it is necessary that the aforementioned portable terminals, before being used, are configured with the optimal operation parameters for that particular room in which they must operate.

The configuration of the single portable terminals can be carried out each time by the individual users that use them or, more preferably, it is of the centralised type.

Portable terminals are known that are capable of providing an indication of the geographical position thereof. This is obtained thanks to the installation into the aforementioned terminals of electronic geographical localisation components of the wireless type (for example GPS, A-GPS, GSM, Wi-Fi™, etc.) or through connection via wire/cables/interfaces (for example Ethernet, USB ports, serial transmissions, etc.) with other detection devices.

These portable terminals are typically capable of communicating with one another and with a central control unit that is arranged in a position which is far from the terminals. Through this central control unit, a centralised configuration of the portable terminals can be carried out.

For such a purpose, the portable terminals communicate the respective geographical position to the central control unit. The central control unit then provides for configuring the portable terminals on the basis of the specific geographical position in which each of them is located.

U.S. Pat. No. 7,487,499 describes an automatic configuration system in which a plurality of units (which can be operating machines, display devices, programmable transmission devices or other types of electronically controlled devices) receives updates of the software from a central updating unit on the basis of the geographical position in which each unit is located. The central updating unit can use a database of correlation between the geographical position of the aforementioned units and the software to be sent to each unit. Such software is typically stored on a remote central unit that is connected to the central updating unit.

The Applicant has found that the configuration of a portable terminal is a very onerous operation in terms of computation, in addition to being very delicate and technically complex in terms of its operation. Consequently, in currently known centralised configuration systems, especially when dealing with a high number of portable terminals to be configured, the resources of the central unit are used to a great extent. The operation load on the central unit is thus substantial and can cause slowing down in the other operations which the central unit is typically used for (for example, operations correlating to managing and storing data).

The Applicant has further found that often, in order to obtain an optimised configuration on specific operation parameters of particular interest for a certain number of portable terminals, it is in any case necessary for an experienced user to act on each portable terminal. This can be very onerous in terms of overall time for setting up all the portable terminals, especially when there are many portable terminals on which the user has to intervene.

The technical problem at the basis of the present invention is that of providing an extremely reliable, flexible and quick method for configuring in a completely automatic and centralised manner even a high number of portable terminals on the basis of their geographical position.

The present invention therefore relates to a method for the automatic configuration of portable terminals, comprising the steps of:

detecting the geographical position of at least two portable terminals;
 configuring said at least two portable terminals as a function of the respective geographical position which has been detected;

characterised in that the step of configuring said at least two portable terminals comprises the steps of:

configuring at least one first terminal of said at least two portable terminals with predetermined configuration parameters selected on the basis of the respective geographical position;
 detecting a condition of geographical proximity of at least one second terminal of said at least two portable terminals with respect to said at least one first terminal;
 at least partially cloning said at least one first terminal into said at least one second terminal.

Throughout the present description and in the subsequent claims, the expression "condition of geographical proximity" of two portable terminals is used to indicate a situation in which the two portable terminals are geographically arranged at a distance from each other that is lower than or equal to a predetermined threshold distance.

Throughout the present description and in the following claims, the terms "clone", "cloning" and the like is used to indicate a simple operation of copying or reproducing or duplicating the operation parameters of a portable terminal on another portable terminal. We therefore refer to an operation that is completely agnostic with respect to the configuration parameters (indeed a copying or reproduction or duplication operation), which in terms of computation is much simpler and faster than a configuration operation which requires, on the other hand, the rational setting of a plurality of operation parameters whose respective meaning is known and recognised. Indeed, in the "cloning" operations the unit managing the cloning does not make any selection of the operation data, but simply acts as an intermediary for the agnostic transfer of such operation data from a reference terminal to a guest terminal, which thus behaves as a simple data collector. On the other hand, in the "configuration" operations the unit managing the configuration or its user knows the meaning of the various operation data, operates a suitable selection of the data of specific interest and actively intervenes on the guest terminal through suitable setting operations.

Advantageously, the method of the present invention makes it possible to achieve, in an extremely quick and reliable manner, the same operation configuration on many portable terminals thanks to the fact that such an operative configuration (which as already mentioned is an operation that is onerous in terms of computation) is set on only one of said portable terminals, which in practice takes up the function of "master", whereas a simple copying or reproduction or duplication operation of the configuration of the master is carried out on the remaining portable terminals that must be configured identically to the master (i.e. those portable terminals which have a predetermined geographical proximity with respect to the master), such remaining portable terminals taking up in practice the function of "slave".

The cloning of the master on the slaves can be made during installation or at the first use of the slaves.

A further advantage of the method of the present invention is that the possible optimisation configuration by an expert user is advantageously carried out on the master only, such an optimised configuration then being automatically cloned on the slaves, thus considerably reducing the overall burden on the system for configuring all the involved terminals.

The method of the invention further allows the expert user to configure the master through a graphical user interface which, preferably, is provided on the master itself. I.e. an "in situ" configuration is carried out. Such a configuration makes it possible to select the most suitable configuration parameters, thus improving the performance of the portable terminals configured like the master with respect to the case in which a remote configuration is carried out, that is by using a graphical user interface which is provided on a central control unit arranged in a position that is far away from the portable terminals to be configured.

In a first preferred embodiment of the method of the invention, the steps of detecting said condition of geographical proximity and of at least partially cloning said at least one first terminal are carried out by a central control unit.

In this case, the central control unit, once the condition of geographical proximity between the master and slave has been detected, reproduces the same operation configuration of the master into the slaves.

Preferably, said central control unit is arranged in a position which is far from said at least two portable terminals. Typically, such a control unit is located inside a management unit acting as a "server".

In a second preferred embodiment of the method of the invention, the step of detecting said condition of geographical proximity is carried out by at least one terminal of said at least two portable terminals and the cloning is carried out by said at least one first terminal.

In this case, the condition of geographical proximity between master and slave is detected by the master or, alternatively, by each slave, or also by both of them. Once such a condition of geographical proximity has been detected, the master sends configuration parameters to the slaves its. Such configuration parameters can be stored on the master itself or in a memory that is suitably arranged remotely (cloud computing, server, or other type of remote storage). Of course, in such a case an electronic component is installed in the portable terminals for at least in the one which will act as the master, and therefore in all of them if all can act as the master), such an electronic component being capable of carrying out the same functions as the central control unit previously described.

Preferably, the configuration of the master that is cloned into the slaves comprises at least one from:

loading and/or updating software, firmware or operating systems;

loading so called "patches" (executable files created for solving a specific programming error, which prevents a program or operating system from operating correctly);

loading and/or setting operation parameters (for example transmission, acquisition, image or data detection parameters, parameters correlated to symbols and/or to the language to be used or recognised, illumination parameters, scanning parameters, etc.) or calibration and/or control parameters (for example calibration and/or control parameters of a touch screen, of a possible wireless interface, of the antenna of a possible GPS locator, etc.);

loading of applications for the end user, with possible selection of the respective operation and/or control parameters.

Preferably, such a configuration is communicated to said at least two portable terminals through wireless transmission means (for example via Wi-Fi™ or rather compatible with the standard IEEE 802.11 a/b/g/n and possible evolutions thereof or Bluetooth™). Alternatively, wires or cables or interfaces (for example Ethernet, USB ports, serial transmissions, etc.) can be used.

In the specific case in which the detection of the condition of geographical proximity is carried out by at least one terminal of said at least two portable terminals (that is in the case in which the aforementioned central control unit is not used), the transfer of the configuration parameters from the master to the slave can occur through the NFC (Near Field Communication) technology. Such a technology can be integrated in the portable terminals in addition to or alternatively to the aforementioned communication technologies (Wi-Fi™, Bluetooth™, etc.).

NFC technology can moreover be used to allow the slaves to acquire from the respective master the configuration parameters for being connected to a central control unit intended to transfer the configuration parameters of the respective master to the slaves.

Preferably, the detection of the geographical position of said at least two portable terminals is carried out through wireless geographical localisation means (for example GPS, A-GPS, GSM, Wi-Fi™, etc.).

In an embodiment of the method of the present invention, the step of configuring at least one first terminal comprises the steps of:

configuring a first terminal with first configuration parameters selected on the basis of the geographical position of said first terminal, and configuring at least one further terminal with respective configuration parameters selected on the basis of the geographical position of said at least one further terminal;

in which the step of detecting said condition of geographical proximity comprises detecting whether said at least one second terminal is closer to said first terminal or to said at least one further terminal;

and in which the step of at least partially cloning said at least one first terminal comprises at least partially cloning said first terminal into said at least one second terminal if said at least one second terminal is closer to said first terminal with respect to said at least one further terminal or at least partially cloning said at least one further terminal into said at least one second terminal if said at least one second terminal is closer to said at least one further terminal with respect to said first terminal.

In this case it is possible to provide for many masters and to configure the slaves identically (or rather in a partially identical manner) to the specific master to which they are closest. In such a way, in addition to a first master positioned in a predetermined geographical area, other masters positioned in other geographical areas and having a different configuration from that of the first master can be provided for (for example, each room of a building can have a specific master that is configured differently from the masters of the other rooms of the building, and therefore the portable terminals in the different rooms of the building will have different configurations from one another).

In a further embodiment of the method of the present invention, the step of detecting said condition of geographical proximity comprises continuously detecting the movement of said at least one second terminal.

It is possible in this way to follow the movement of the various portable terminals from a geographical area in which there is a first master to another geographical area in which there is a second master and, consequently, update the configuration of the slaves with that of the first master when they are nearer to it so and pass to that of the second master when they are nearer to the latter.

In a further embodiment of the method of the present invention, the step of at least partially cloning said at least one first terminal comprises the step of cloning a portion of said at least one first terminal into said at least one second terminal, said portion being variable on the basis of the distance of said at least one second terminal from said at least one first terminal or on the basis of the difference between the configuration parameters of said at least one first terminal and the configuration parameters of said at least one second terminal.

Also in this case many masters, positioned in different geographical areas, can be provided for.

In the latter embodiment, the slaves are partially configured, with a cloning percentage of the closest master which increases as the distance from such a master decreases.

When many masters and many slaves are provided, the position of the masters and of the slaves is monitored continuously so as to correctly clone, based upon the aforementioned proximity criteria, a respective master into a corresponding group of slaves.

Further characteristics and advantages of the method of the present invention shall become clearer from the following detailed description of a preferred embodiment thereof, given purely as an example and not for limiting purposes with reference to the attached drawing. In such drawings:

FIG. 1 shows a first embodiment of a system in which a first configuration modality of a plurality of portable terminals is carried out on the basis of their geographical position. The system is wholly indicated with reference numeral 10, whereas the portable terminals are indicated with T1, T2, T3, T4, T5, T6, T7.

System 10 comprises a central control unit S, which—in the non limiting example illustrated herein—is located in a predetermined position which is far from the portable terminals T1-T7.

Figure 1:
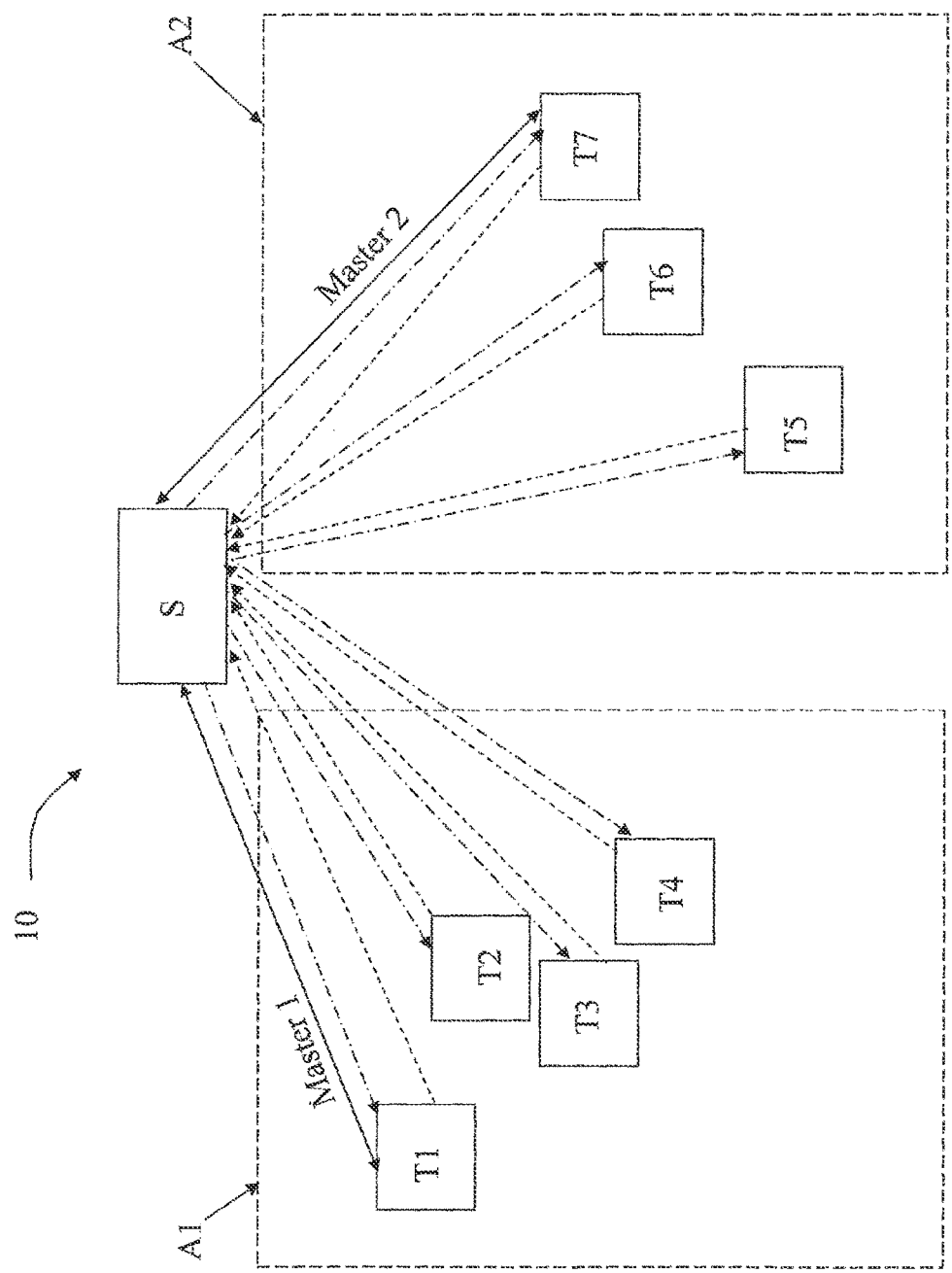
FIG. 1 is a schematic diagram of a first embodiment of a system actuating a configuration method according to the present invention.

Wireless transmission means, illustrated in FIG. 1 with rectilinear arrows with a solid line, a broken line and a dash-dotted line are provide between the central control unit S and the portable terminals T1-T7. The wireless transmission means are for example such as to make a Wi-Fi™ transmission, or rather compatible with the standard IEEE 802.11 a/b/g/n and possible evolutions thereof, or Bluetooth™.

Portable terminals T1-T7 are provided with respective geographical localization means (not illustrated), preferably of the wireless type (for example GPS, A-GPS, GSM, Wi-Fi™, etc.): the arrows with broken line between the portable terminals T1-T7 and the central control unit S represent the communication to the central control unit S of the geographical position of each portable terminal T1-T7.

Central control unit S communicates predetermined configuration parameters to such terminal T1 on the basis of the geographical area in which the portable terminal T1 is located, so as to allow the correct operation of the terminal T1 in the respective geographical area.

In the non limiting example of FIG. 1, central control unit S also communicates different configuration parameters to a second portable terminal T7 which is located in a geographical area that is different from that in which the portable terminal T1 is. The configuration parameters of the portable terminal T7 are indeed selected on the basis of the geographical area in which it is located and are such as to allow the correct operation of the terminal T7 in the respective geographical area.

In FIG. 1 the aforementioned communication is schematised by the two dash-dotted lines extending between central control unit S and portable terminals T1 and T7.

Portable terminals T1, T7 in such a case take up the function of master.

The assigning of such a function of master can be made by central control unit S based upon the detection of the geographical position of portable terminals T1, T7. Alternatively, portable terminals T1 and T7 themselves can communicate such information to central control unit S. In FIG. 1, this is schematised by the two bi-directional arrows with solid line extending between portable terminals T1 and T7 and central control unit S.

Preferably, the role of master is assigned through an automated process, for example through reading by the portable terminals T1 and T7 of a respective optical code arranged in the respective geographical area in which they operate.

Master T1 is cloned, by central control unit S, into the remaining portable terminals T2-T4 that have a predetermined condition of geographical proximity with respect to the master T1. Analogously, master T7 is cloned, by central control unit S, into the remaining portable terminals T5-T6 that have a predetermined condition of geographical proximity with respect to the master T7.

FIG. 1 schematically shows the situation in which master T1 is cloned by central control unit S into portable terminals T2, T3 and T4 that are in the area A1 that defines the predetermined condition of geographical proximity with respect to master T1 and master T7 is cloned by central control unit S into portable terminals T5 and T6 that are in the area A2 that defines the predetermined condition of geographical proximity with respect to master T7. Terminals T2-T4 thus take up the same configuration parameters as the master T1 (therefore behaving as slaves or clones of the latter) and terminals T5 and T6 take up the same configuration parameters as the master T7 (therefore behaving as slaves or clones of the latter). The cloning of terminals T2-T6 is represented in FIG. 1 by the arrows with dash-dotted line extending between central control unit S and portable terminals T2-T6.

Alternatively, only one portion of the configuration of master T1 and T7 is cloned into the respective slaves T2-T6, such a portion being variable on the basis of the distance of slaves T2-T6 from the respective master T1, T7 or of the actual difference between the previous configuration and the updated one (indeed, from a comparison it could be that only some of the configuration parameters of the slave are actually different from those of the master to which it is being associated, so that only one subset of the configuration parameters of the slave is updated).

From FIG. 1 a possible further embodiment of the method of the present invention can be conceived, wherein a single master is provided. Let us consider for example a situation in which terminal T7 behaves as a slave (therefore like terminals T5 and T6) and the only master is terminal T1. In such a case, if master T1 moves from the area A1 to a different area (for example to area A2), the terminals located in this different area (terminals T5-T7) take through cloning, the same configuration parameters as the master T1.

In the examples described above, the detection of the geographical position of all the terminals T1-T7 is carried out by central control unit S, which subsequently provides for cloning masters T1 and T7 into the respective slaves T2-T6 based upon the aforementioned proximity criteria.

Figure 2:
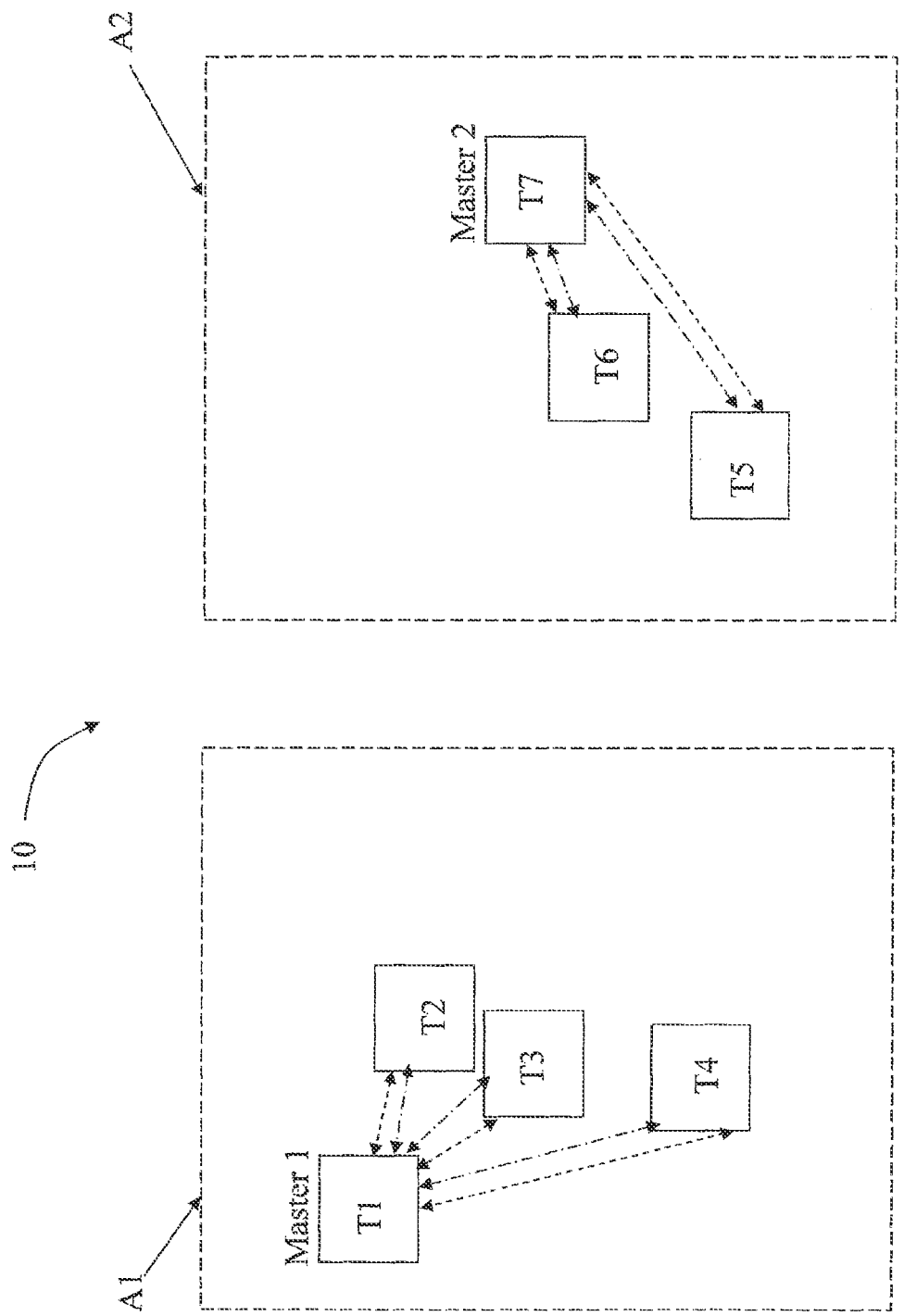
FIG. 2 is a schematic diagram of a second embodiment of a system actuating a configuration method according to the present invention.

FIG. 2 shows a variant of the system of FIG. 1.

The system of FIG. 2 actuates a method that is mostly identical to the one described above with reference to FIG. 1. The only difference is that the cloning of master T1 on respective slaves T2-T4 is carried out by master T1 itself and the cloning of masters T7 on respective slaves T5, T6 is carried out by master T7 itself.

In such a case, the detection of the condition of geographical proximity between master T1 and relative slaves T2-T4 can be made by master T1, which detects its distance from each terminal T2-T6 to then configure terminals T2-T4 as its clones, terminals T2-T4 being those that are in the geographical area A1 in which there is the desired geographical proximity with respect to master T1. Analogously, the detection of the condition of geographical proximity between master T7 and relative slaves T5 and T6 is carried out by master T7, which detects its distance from each terminal T5 and T6 to then configure terminals T5 and T6 as its clones, terminals T5 and T6 being those that are in the geographical area A2 in which there is the desired geographical proximity with respect to master T7.

Alternatively, the condition of geographical proximity between each master T1, T7 and the relative slave T2-T6 is carried out by each slave, which detects its distance from masters T1, T7 and selects, as master, the one which is closest thereto. In FIG. 2 this is schematically shown by the bi-directional arrows with solid line and by those with dash-dotted line extending between master T1 and its slaves T2-T4 and between master T7 and its slaves T5 and T6.

Again with reference to FIG. 2, terminals T1-T7 can be equipped with special devices that are adapted to allow the transfer of the configuration parameters from masters T1, T7 to respective slaves T2-T6 through NFC (Near Field Communication) technology. Such a technology can be used in addition to or alternatively to the communication technologies described previously.

In order to use the NFC technology, masters T1, T7 are equipped with respective wireless transmission/receiver devices (active tags) with short range (typically to a maximum of 10 cm). The other terminals T2-T6 are preferably also equipped with respective active tags with short range, so that each terminal T1-T7 can act either as master or slave. Alternatively, terminals T2-T6 are equipped with respective receiver devices (passive tags) with short range; in such a case terminals T2-T6 can only act as slaves.

In use, the transfer of the configuration from masters T1, T7 to slaves T2-T6 occurs as soon as slaves T2-T6 are at a short distance (typically shorter than 10 cm) from the respective master T1, T7.

The transfer of the configuration from masters T1, T7 to slaves T2-T6 can alternatively occur through a central control unit arranged in a position that is far from terminals T1-T7. In such a case, the NFC technology is used to allow the slaves T2-T6 to acquire, from the respective master T1, T7, the configuration parameters for connecting to said central control unit. Once the connection of the slave T2-T6 to the central control unit has been enabled, the latter provides for transferring the configuration parameters of the respective master T1, T7 to such a slave T2-T6.

In all the embodiments described above, the configuration of masters T1 and T7 comprises at least one from:
  loading and/or updating software, firmware or operating systems;
  loading so called "patches";
  loading and/or setting operation parameters (for example transmission, acquisition, detection of images or data parameters, parameters that are correlated to symbols and/or to the language to be used or recognised, illumination parameters, scanning parameters, etc.) or calibration and/or control parameters (for example calibration and/or control parameters of the touch screen, of a possible wireless interface, of the antenna of a possible GPS locator, etc.);
  loading applications for the end user, with possible selection of the relative operation and/or control parameters.

Slaves T2-T6 are then configured, through cloning, identically to the respective masters T1, T7.

It is also foreseen an embodiment in which the movement of slaves T2-T6 is detected substantially continuously, so as to detect in a dynamic manner migration of the slaves from a first geographical area having a first master to a second geographical area having a second master and update the configuration of the slaves from the one of the first master to the one of the second master. For example, with reference to FIGS. 1 and 2, if one or more of terminals T2-T4 moves from area A1 to area A2, it/they take(s) up, through cloning, the same configuration parameters as the master T7. Analogously, if one or more of terminals T5-T6 moves from area A2 to area A1, it/they take(s) up, through cloning, the same configuration parameters as the master T1.

It is moreover foreseen an embodiment in which the cloning into the slaves varies over the time, in particular increases as the slaves come closer to a predetermined master. In this last embodiment, the slaves are thus configured with a cloning percentage of the master closest thereto that increases or in any case varies as the distance from such a master shortens.

Of course, a man skilled in the art, in order to satisfy specific and contingent requirements, may bring numerous changes and variants to the invention described above, all these changes and variants being anyway within the scope of protection of the present invention as defined by the following claims.

The invention claimed is:

1. A method for the automatic configuration of portable terminals, the method comprising:
    detecting geographical position of at least two portable terminals;
    configuring at least one first terminal of the at least two portable terminals with predetermined configuration parameters selected on the basis of the respective geographical position detected for the at least one first terminal;
    detecting a condition of geographical proximity of at least one second terminal of the at least two portable terminals with respect to the at least one first terminal; and
    at least partially cloning the at least one first terminal into the at least one second terminal,
    wherein configuring at least one first terminal comprises:
        configuring a first terminal with first configuration parameters selected on the basis of the geographical position of the first terminal, and
        configuring at least one further terminal with respective configuration parameters selected on the basis of the geographical position of the at least one further terminal;
    wherein detecting the condition of geographical proximity comprises detecting whether the at least one second terminal is closer to the first terminal or to the at least one further terminal; and
    wherein at least partially cloning the at least one first terminal comprises at least partially cloning the first terminal into the at least one second terminal if the at least one second terminal is closer to the first terminal with respect to the at least one further terminal or at least partially cloning the at least one further terminal into at least one second terminal if the at least one second terminal is closer to the at least one further terminal with respect to the first terminal.

2. The method of claim 1, wherein detecting the condition of geographical proximity and of at least partially cloning the at least one first terminal are carried out by a central control unit.

3. The method of claim 2, wherein the central control unit is arranged in a position remote from the at least two portable terminals.

4. The method of claim 1, wherein detecting the condition of geographical proximity is carried out by at least one terminal of the at least two portable terminals and cloning is carried out by the at least one first terminal.

5. The method of claim 4, wherein detecting the condition of geographical proximity is carried out by the at least one first terminal.

6. The method of claim 4, wherein the detection of the condition of geographical proximity is carried out by the at least one second terminal.

7. The method of claim 1, wherein detecting the geographical position includes performing a wireless geographical locational method selected from the group consisting of GPS, A-GPS, GSM, and WiFi.

8. The method of claim 1, wherein detecting the condition of geographical proximity comprises continuously detecting the movement of the at least one second terminal.

9. The method of claim 1, wherein at least partially cloning the at least one first terminal comprises cloning a portion of the at least one first terminal into the at least one second terminal, the portion being variable on the basis of the distance of the at least one second terminal from the at least one first terminal.

10. The method of claim 1, wherein at least partially cloning the at least one first terminal comprises cloning a portion of the at least one first terminal into the at least one second terminal, the portion being variable on the basis of the difference between the configuration parameters of the at least one first terminal and the configuration parameters of the at least one second terminal.

11. The method of claim 1, wherein configuring at least one first terminal further comprises configuring at least one first terminal operation based on operation modalities required by the environment where the at least two portable terminals are used.

12. The method of claim 1, wherein at least partially cloning the at least one first terminal into the at least one second terminal includes loading patches.

13. The method of claim 1, wherein at least partially cloning the at least one first terminal into the at least one second terminal includes loading operational parameters selected from the group consisting of transmission parameters, acquisition parameters, image or data detection parameters, parameters correlated to symbols to be recognized, parameters correlated to a language to be used, illumination parameters, and scanning parameters.

14. The method of claim 1, wherein at least partially cloning the at least one first terminal into the at least one second terminal includes loading of applications.

15. A method for the automatic configuration of portable terminals, the method comprising:
    configuring each of a first terminal and a second terminal as a master device from which other terminals receive operational configuration parameters; and
    configuring a third terminal as a slave device which receives operational configuration parameters from a master device;
    receiving, at the third terminal, a first set of operational configuration parameters associated with cloning of the first terminal responsive to detection of the third terminal being relatively closer to the first terminal than the second terminal; and
    receiving, at the third terminal, a second set of operational configuration parameters associated with cloning of the second terminal responsive to detection of the third terminal being relatively closer to the second terminal than the first terminal, wherein the first set of operational configuration parameters are different than the second set of operational configuration parameters.

16. A system, comprising:
    a first portable electronic terminal and a second portable electronic terminal each configured as a master device from which other portable electronic terminals receive operational configuration parameters; and
    a third portable electronic terminal configured as a slave device which receives operational configuration parameters from a master device, wherein the third portable electronic terminal is configured to:
  receive a first set of operational configuration parameters associated with cloning of the first portable electronic terminal responsive to detection of the third portable electronic terminal being relatively closer to the first portable electronic terminal than the second portable electronic terminal; and
  receive a second set of operational configuration parameters associated with cloning of the second portable electronic terminal responsive to detection of the third portable electronic terminal being relatively closer to the second portable electronic terminal than the first portable electronic terminal, wherein the first set of operational configuration parameters are different than the second set of operational configuration parameters.

17. The system of claim 16, wherein the third portable electronic terminal is configured to receive the respective operational configuration parameters from the first portable electronic terminal or the second portable electronic terminal via near field communication (NFC).

18. The system of claim 16, further comprising a central control unit remote from the first portable electronic terminal, the second portable electronic terminal, and the third portable electronic terminal, and wherein the third portable electronic terminal is configured to:
  receive instructions over a short range connection with either the first portable electronic terminal or the second portable electronic terminal; and
  establish a connection with the central control unit and receive either the first set of operational configuration parameters or the second set of operational configuration parameters from the central control unit according to the instructions.

19. The system of claim 16, wherein at least one device is configured to:
  continuously monitor a geographic location of the first portable electronic terminal, the second portable electronic terminal, and the third portable electronic terminal relative to each other; and
  enable cloning of the first portable electronic terminal to the third portable electronic terminal responsive to detection of the third portable electronic terminal being relatively closer to the first portable electronic terminal than the second portable electronic terminal; and
  enable cloning of the second portable electronic terminal to the third portable electronic terminal responsive to detection of the third portable electronic terminal being relatively closer to the second portable electronic terminal than the first portable electronic terminal.

20. The system of claim 16, wherein the first portable electronic terminal and the second portable electronic terminal are configured as master devices with their respective sets of operational configuration parameters responsive to detecting an optical code.

* * * * *